United States Patent
Walsh

(10) Patent No.: US 8,127,873 B1
(45) Date of Patent: Mar. 6, 2012

(54) ELECTRIC POWERED AUTOMOBILE/WHEEL TURBINE MOTOR

(76) Inventor: Robert D. Walsh, Frazee, MN (US)

( * ) Notice: Subject to any disclaimer, the term of this patent is extended or adjusted under 35 U.S.C. 154(b) by 234 days.

(21) Appl. No.: 11/823,014

(22) Filed: Jun. 26, 2007

(51) Int. Cl.
*B60K 1/00* (2006.01)

(52) U.S. Cl. ...................................... 180/65.1; 180/65.6

(58) Field of Classification Search .................. 180/65.1, 180/65.6, 65.4, 243, 165, 292, 6.28, 65.2, 180/65.24, 65.22, 65.28, 291; 903/910, 919, 903/925, 940; 475/6, 2, 5, 3; 701/22
See application file for complete search history.

(56) References Cited

U.S. PATENT DOCUMENTS

| | | | |
|---|---|---|---|
| 3,799,284 A * | 3/1974 | Hender | 180/65.2 |
| 4,042,056 A | 8/1977 | Horwinski | |
| 4,119,861 A | 10/1978 | Gocho | |
| 5,465,806 A * | 11/1995 | Higasa et al. | 180/65.1 |
| 6,024,182 A * | 2/2000 | Hamada et al. | 180/65.2 |
| 6,123,398 A * | 9/2000 | Arai et al. | 180/65.2 |
| 6,170,596 B1 * | 1/2001 | Triarsi et al. | 180/291 |
| 6,205,379 B1 * | 3/2001 | Morisawa et al. | 701/22 |
| 6,321,865 B1 * | 11/2001 | Kuribayashi et al. | 180/243 |
| 6,333,620 B1 * | 12/2001 | Schmitz et al. | 320/132 |
| 6,387,007 B1 * | 5/2002 | Fini, Jr. | 180/65.4 |
| 6,484,834 B2 * | 11/2002 | Bowen et al. | 180/65.6 |
| 6,524,215 B1 * | 2/2003 | Schmidt | 903/910 |
| 7,112,155 B2 * | 9/2006 | Keuth | 475/6 |
| 7,112,891 B2 | 9/2006 | Johnson | |
| 7,363,995 B2 * | 4/2008 | Downs et al. | 180/65.1 |
| 2010/0025131 A1 * | 2/2010 | Gloceri et al. | 180/65.28 |

* cited by examiner

*Primary Examiner* — Hau Phan

(57) ABSTRACT

An axle has wheels, a wheel turbine and an electric motor. The electric motor is provided on the axle between the wheel turbine and each rear wheel. Each reversible rear electric motor is adapted to engage and disengage with the wheel turbine. A battery is coupled to each electric motor powered by the wheel turbine.

1 Claim, 2 Drawing Sheets

ELECTRIC POWERED AUTOMOBILE/WHEEL TURBINE MOTOR

BACKGROUND OF THE INVENTION

1. Field of the Invention

The present invention relates to an electric powered automobile/wheel turbine motor and more particularly pertains to powering a vehicle in a safe, ecologically friendly and cost effective manner.

2. Description of the Prior Art

The use of power systems of known designs and configurations is known in the prior art. More specifically, power systems of known designs and configurations previously devised and utilized for the purpose of providing power through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 7,112,891 issued Sep. 26, 2006 to Johnson relates to a Mobile-Power System with Solar-Powered Hydrogen Liberator, Fuel Cell, Turbine, and Capacitors. U.S. Pat. No. 4,119,861 issued Oct. 10, 1978 to Gocho relates to a Starting Apparatus for Gas Turbine-Generator Mounted on Electric Motor Driven Motorcar. Lastly, U.S. Pat. No. 4,042,056 issued Apr. 16, 1977 to Horwinski relates to a Hybrid Powered Automobile.

While these devices fulfill their respective, particular objectives and requirements, the aforementioned patents do not describe an electric powered automobile/wheel turbine motor that allows for powering a vehicle in a safe, ecologically friendly and cost effective manner.

In this respect, the electric powered automobile/wheel turbine motor according to the present invention substantially departs from the conventional concepts and designs of the prior art, and in doing so provides an apparatus primarily developed for the purpose of powering a vehicle in a safe, ecologically friendly and cost effective manner.

Therefore, it can be appreciated that there exists a continuing need for a new and improved electric powered automobile/wheel turbine motor which can be used for powering a vehicle in a safe, ecologically friendly and cost effective manner. In this regard, the present invention substantially fulfills this need.

SUMMARY OF THE INVENTION

In view of the foregoing disadvantages inherent in the known types of power systems of known designs and configurations now present in the prior art, the present invention provides an improved electric powered automobile/wheel turbine motor. As such, the general purpose of the present invention, which will be described subsequently in greater detail, is to provide a new and improved electric powered automobile/wheel turbine motor and method which has all the advantages of the prior art and none of the disadvantages.

To attain this, the present invention essentially comprises an electric powered automobile/wheel turbine motor. First provided is a front axle. The front axle has laterally spaced front wheels. The front axle has a centrally located rotatable front electric motor. The front axle has rotatable pulleys. The pulleys are provided adjacent to each front wheel. The pulleys are adapted to power an air conditioning system.

A rear axle is provided. The rear axle has laterally spaced rear wheels. The rear axle has a centrally located wheel turbine. The wheel turbine is adapted to receive power by motion of a vehicle in which the rear axle and the wheel turbine are located. The wheel turbine is further adapted to power the front electric motor on the front axle. The rear axle has a reversible rear electric motor. The reversible rear electric motor is provided on the rear axle between the wheel turbine and each rear wheel. Each reversible rear electric motor is adapted to engage and disengage with the wheel turbine for a four wheel drive assist. The rear axle has a plate. The plate is attached to each rear electric motor. In this manner securement to a lower component of a supporting vehicle is provided. The wheel turbine is adapted to power a 220 volt electric outlet and a 110 volt electric outlet.

Further provided is a deep cycle battery. The deep cycle battery is coupled to each reversible electric motor on the rear axle. The deep cycle battery powers the rear electric motors and the wheel turbine.

The system is adapted to receive a key. The key is coupled with respect to the two batteries. The key turns on the two batteries and the wheel turbine. In this manner when a key turns on the two batteries, the two batteries will turn the electric motors which will turn on the wheel turbine and engage the rear wheels to initiate motion of the vehicle. The electric motors function to maintain the correct revolutions per minute until the rear wheels reach their correct revolutions per minute. The two electric motors will maintain two charged batteries and will maintain power in all situations by turning the wheel turbine.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved electric powered automobile/wheel turbine motor which has all of the advantages of the prior art power systems of known designs and configurations and none of the disadvantages.

It is another object of the present invention to provide a new and improved electric powered automobile/wheel turbine motor which may be easily and efficiently manufactured and marketed.

It is further object of the present invention to provide a new and improved electric powered automobile/wheel turbine motor which is of durable and reliable constructions.

An even further object of the present invention is to provide a new and improved electric powered automobile/wheel turbine motor which is susceptible of a low cost of manufacture with regard to both materials and labor, and which accordingly is then susceptible of low prices of sale to the consuming public, thereby making such electric powered automobile/wheel turbine motor economically available to the buying public.

Even still another object of the present invention is to provide an electric powered automobile/wheel turbine motor for powering a vehicle in a safe, ecologically friendly and cost effective manner.

Lastly, it is an object of the present invention to provide a new and improved electric powered automobile/wheel turbine motor. An axle has wheels, a wheel turbine and an electric motor. The electric motor is provided on the axle between the wheel turbine and each rear wheel. Each reversible rear electric motor is adapted to engage and disengage with the wheel turbine. A battery is coupled to each electric motor powered by the wheel turbine.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
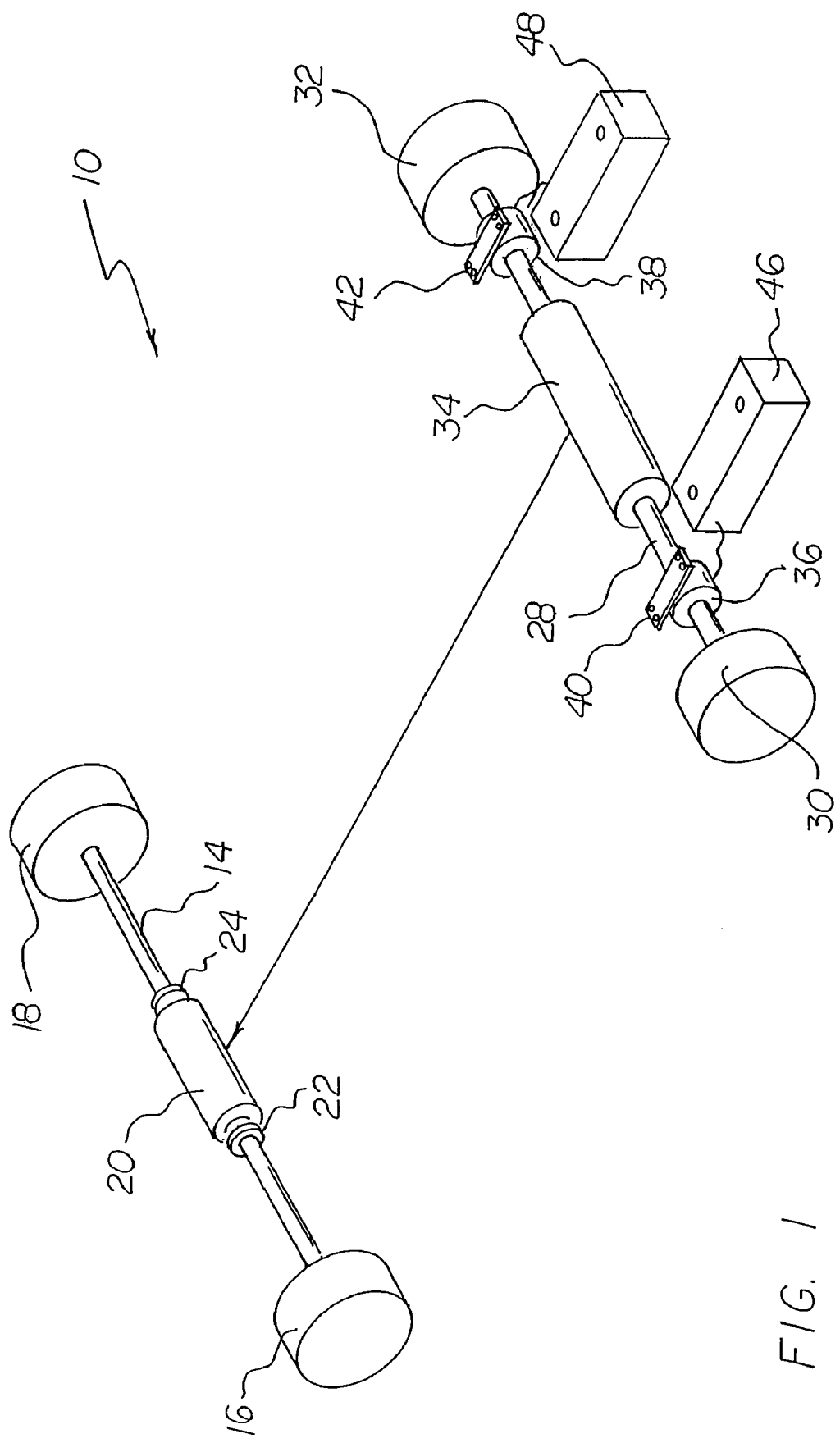
FIG. 1 is a perspective illustration of an electric electric powered automobile/wheel turbine motor constructed in accordance with the principles of the present invention.
Figure 2:
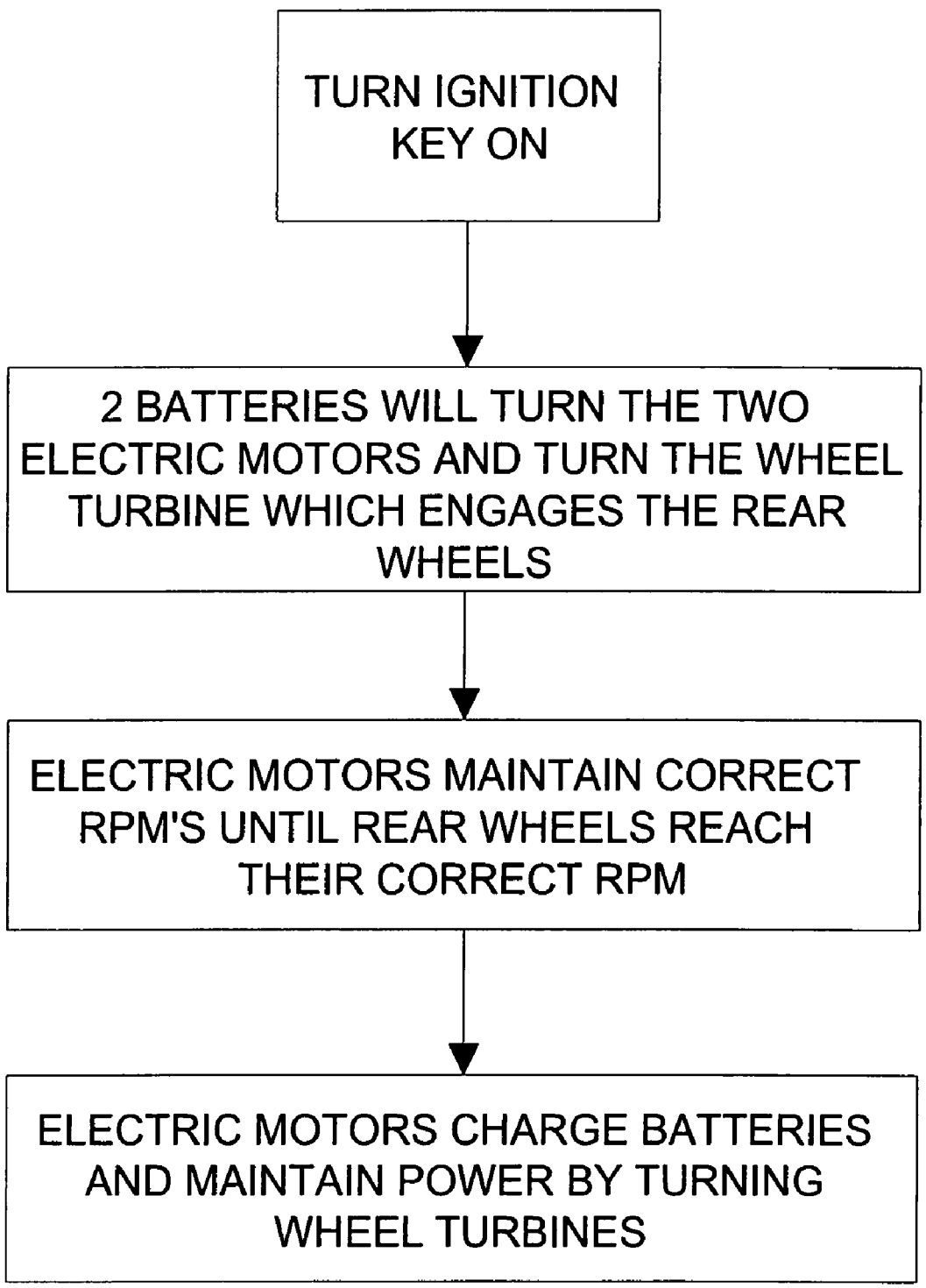
FIG. 2 is a flow diagram illustrating the operation of the system of the present invention.

With reference now to the drawings, and in particular to FIG. 1 thereof, the preferred embodiment of the new and improved electric powered automobile/wheel turbine motor embodying the principles and concepts of the present invention and generally designated by the reference numeral 10 will be described.

The present invention, the electric powered automobile/wheel turbine motor 10 is comprised of a plurality of components. Such components in their broadest context include an axle and a battery. Such components are individually configured and correlated with respect to each other so as to attain the desired objective.

First provided is a front axle 14. The front axle has laterally spaced front wheels 16, 18. The front axle has a centrally located rotatable front electric motor 20. The front axle has rotatable pulleys 22, 24. The pulleys are provided adjacent to each front wheel. The pulleys are adapted to power an air conditioning system.

A rear axle 28 is provided. The rear axle has laterally spaced rear wheels 30, 32. The rear axle has a centrally located wheel turbine 34. The wheel turbine is adapted to receive power by motion of a vehicle in which the rear axle and the wheel turbine are located. The wheel turbine is further adapted to power the front electric motor on the front axle. The rear axle has a reversible rear electric motor 36, 38. The reversible rear electric motor is provided on the rear axle between the wheel turbine and each rear wheel. Each reversible rear electric motor is adapted to engage and disengage with the wheel turbine for a four wheel drive assist. The rear axle has a plate 40, 42. The plate is attached to each rear electric motor. In this manner securement to a lower component of a supporting vehicle is provided. The wheel turbine is adapted to power a 220 volt electric outlet and a 110 volt electric outlet.

Further provided is a deep cycle battery 46, 48. The deep cycle battery is coupled to each reversible electric motor on the rear axle. The deep cycle battery powers the rear electric motors and the wheel turbine.

The system is adapted to receive a key. The key is coupled with respect to the two batteries. The key turns on the two batteries and the wheel turbine. In this manner when a key turns on the two batteries, the two batteries will turn the electric motors which will turn on the wheel turbine and engage the rear wheels to initiate motion of the vehicle. The electric motors function to maintain the correct revolutions per minute until the rear wheels reach their correct revolutions per minute. The two electric motors will maintain two charged batteries and will maintain power in all situations by turning the wheel turbine.

The alternate embodiment of the present invention includes an ignition 56. The ignition is coupled to the batteries. The ignition turns on the batteries and the wheel turbine. In this manner the ignition turns on the batteries. The batteries will turn the electric motors which will turn on the wheel turbine and engage the rear wheels to initiate motion of the vehicle. The electric motor functions to maintain the correct revolutions per minute until the wheels reach their correct revolutions per minute. The electric motors will maintain charged batteries and will maintain power by turning the wheel turbine.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An electric powered automobile/wheel turbine motor for powering a vehicle, comprising, in combination:
    a front axle with laterally spaced front wheels and a centrally located rotatable front electric motor on the front axle to drive the front wheels, rotatable pulleys on the front axle adjacent to each front wheel adapted to power an air conditioning system;

a rear axle with laterally spaced rear wheels and a centrally located wheel turbine on the rear axle, the wheel turbine adapted to receive power by rotation of the rear wheels through motion of the vehicle in which the rear axle and the wheel turbine are located, the wheel turbine adapted to electrically power the front electric motor on the front axle, a reversible rear electric motor on the rear axle between the wheel turbine and each rear wheel, each reversible rear electric motor adapted to engage and disengage with the wheel turbine to power the wheel turbine for a four wheel drive assist, a plate attached to each rear electric motor for securement to a lower component of a supporting vehicle, the wheel turbine adapted to power a 220 volt electric outlet and a 110 volt electric outlet;

a deep cycle battery coupled to each reversible electric motor on the rear axle for powering the rear electric motors and the wheel turbine; and a key coupled with respect to the two batteries to turn on the two batteries and the wheel turbine whereby when the key turns on the two batteries, the two batteries will turn the electric motors which will turn on the wheel turbine and engage the rear wheels to initiate motion of the vehicle, whereupon the electric motors function to maintain the correct revolutions per minute until the rear wheels reach their correct revolutions per minute, whereafter the two electric motors will maintain two charged batteries and will maintain power in all situations by turning the wheel turbine.

\* \* \* \* \*